US009007301B1

(12) United States Patent
Raffle et al.

(10) Patent No.: US 9,007,301 B1
(45) Date of Patent: Apr. 14, 2015

(54) USER INTERFACE

(71) Applicants: Hayes Solos Raffle, Palo Alto, CA (US); Nirmal Patel, Mountain View, CA (US)

(72) Inventors: Hayes Solos Raffle, Palo Alto, CA (US); Nirmal Patel, Mountain View, CA (US)

(73) Assignee: Google Inc., Mountain View, CA (US)

( * ) Notice: Subject to any disclaimer, the term of this patent is extended or adjusted under 35 U.S.C. 154(b) by 189 days.

(21) Appl. No.: 13/649,800

(22) Filed: Oct. 11, 2012

(51) Int. Cl.
G09G 5/00 (2006.01)
G09G 3/00 (2006.01)

(52) U.S. Cl.
CPC .................................... G09G 3/003 (2013.01)

(58) Field of Classification Search
CPC ......... G06F 3/013; G06F 3/011; G06F 3/012; G06F 3/005; G02B 27/017; G02B 27/0172; G02B 2027/014; G02B 2027/0178; G02B 2027/0138; G02B 2027/0187; H04N 13/0484
USPC .................................................. 345/7, 8, 156
See application file for complete search history.

(56) References Cited

U.S. PATENT DOCUMENTS

| | | | | | |
|---|---|---|---|---|---|
| 5,360,971 | A | * | 11/1994 | Kaufman et al. | 250/221 |
| 5,517,021 | A | * | 5/1996 | Kaufman et al. | 250/221 |
| 5,751,260 | A | * | 5/1998 | Nappi et al. | 345/8 |
| 6,323,884 | B1 | | 11/2001 | Bird | |
| 6,421,064 | B1 | * | 7/2002 | Lemelson et al. | 345/688 |
| 6,636,763 | B1 | | 10/2003 | Junker | |
| 7,091,928 | B2 | * | 8/2006 | Rajasingham | 345/7 |
| 8,587,514 | B2 | * | 11/2013 | Lundstrom | 345/156 |
| 2002/0105482 | A1 | * | 8/2002 | Lemelson et al. | 345/7 |
| 2002/0122014 | A1 | * | 9/2002 | Rajasingham | 345/8 |
| 2002/0158815 | A1 | * | 10/2002 | Zwern | 345/7 |
| 2010/0201626 | A1 | * | 8/2010 | Krah et al. | 345/163 |
| 2012/0068914 | A1 | * | 3/2012 | Jacobsen et al. | 345/8 |
| 2012/0083312 | A1 | * | 4/2012 | Kim | 455/556.1 |
| 2012/0188148 | A1 | * | 7/2012 | DeJong | 345/8 |
| 2012/0200601 | A1 | | 8/2012 | Osterhout | |
| 2013/0293488 | A1 | * | 11/2013 | Na et al. | 345/173 |
| 2013/0300636 | A1 | * | 11/2013 | Cunningham et al. | 345/8 |

OTHER PUBLICATIONS

Functionx, Windows Menus, online Feb. 9, 2008, https://web.archive.org/web/20080209025230/http://www.functionx.com/windows/Lesson04.htm.*
Robert J. K. Jacob, The Use of Eye Movements in Human-Computer Interaction Techniques: What You Look At is What You Get, ACM Transactions on Information Systems, vol. 9, No. 3, Apr. 1991, pp. 152-169.

* cited by examiner

*Primary Examiner* — Dmitriy Bolotin
(74) *Attorney, Agent, or Firm* — McDonnell Boehnen Hulbert & Berghoff LLP

(57) ABSTRACT

Systems and methods for navigation and selection with eye gestures in a graphical display are provided, in which a graphical display of content may be provided to a wearer of a head-mountable device. A first signal may be received from a first sensor configured to detect an eye gesture of a first eye of the wearer. A second signal may then be received from a second sensor configured to detect an eye gesture of a second eye of the wearer. The first signal may be associated to a first command to navigate through or select an item in the graphical display of content provided by the head-mountable device, and the second signal may be associated to a subsequent command, based at least in part on a given output of the first command, to navigate through or select another item in the graphical display of content.

20 Claims, 11 Drawing Sheets

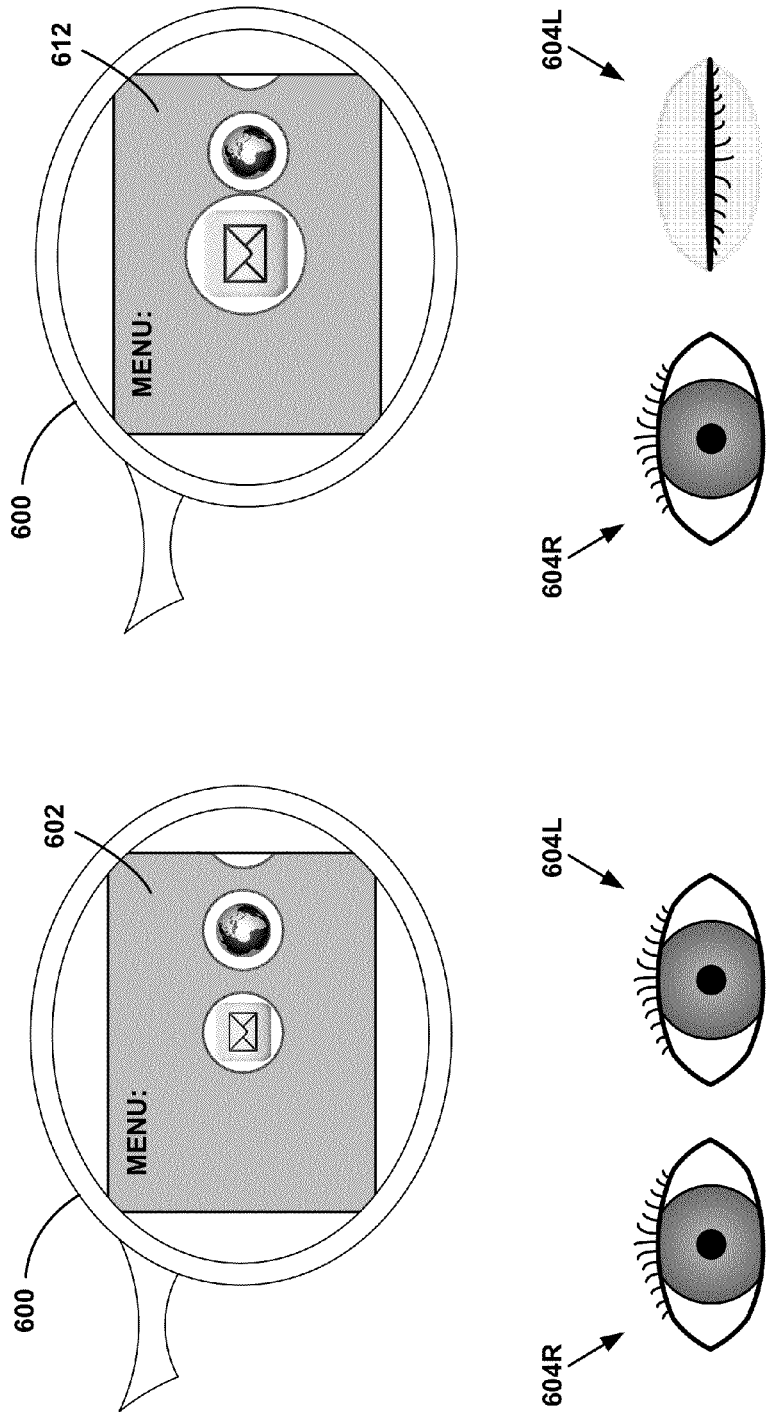

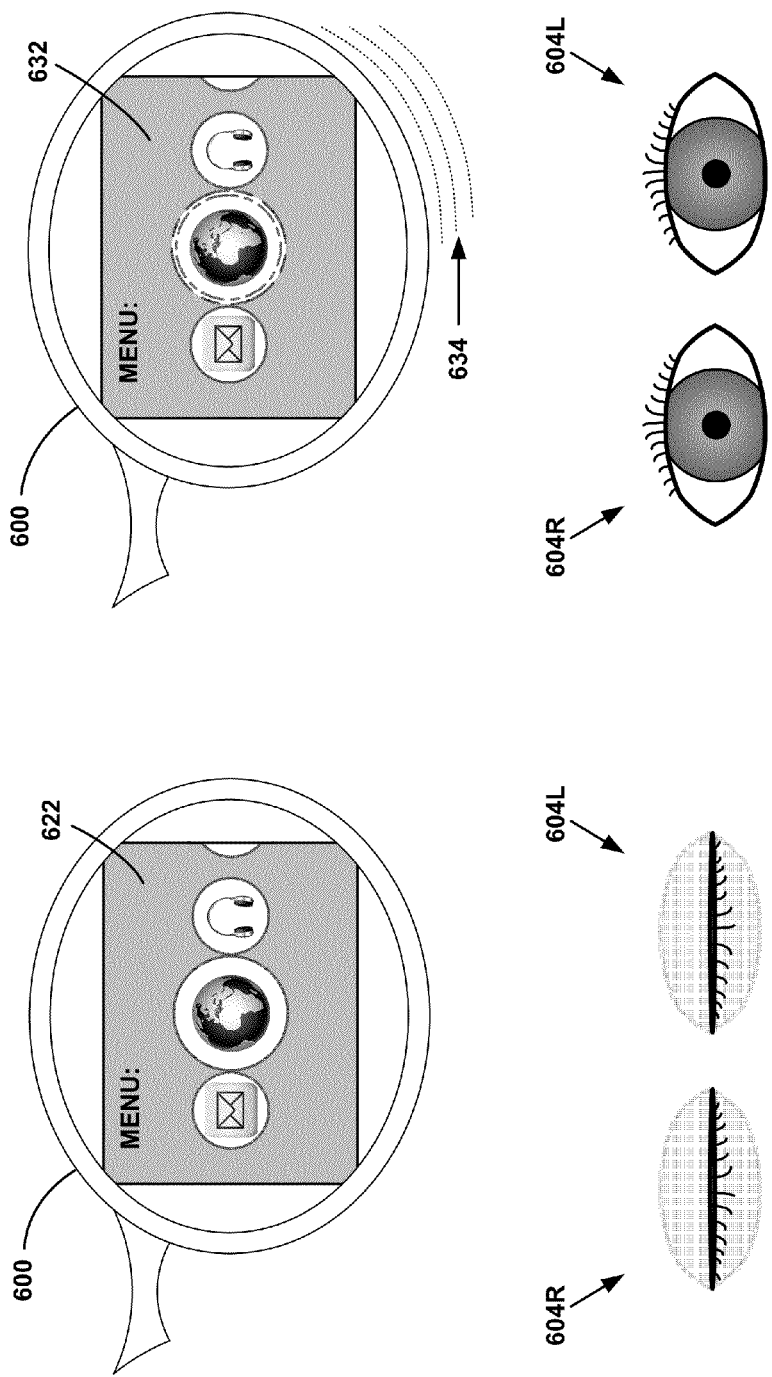

USER INTERFACE

BACKGROUND

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a small image display element close enough to a wearer's (or user's) eye(s) such that the displayed image fills or nearly fills the field of view, and appears as a normal sized image, such as might be displayed on a traditional image display device. The relevant technology may be referred to as "near-eye displays," and a wearable-computing device that integrates one or more near-eye displays may be referred to as a "head-mountable device" (HMD).

A head-mountable device places a graphic display or displays close to one or both eyes of a wearer. To generate the images on a display, a computer processing system may be used. Such displays may occupy a wearer's entire field of view, or only occupy part of wearer's field of view. Further, head-mountable devices may be as small as a pair of glasses or as large as a helmet.

SUMMARY

The present application discloses systems and methods for navigation and selection with eye gestures in a graphical display. In one aspect, a method is described. The method may comprise receiving a first signal indicative of a detected eye gesture of a first eye. The method may also comprise receiving a second signal indicative of a detected eye gesture of a second eye. The method may further comprise associating the first signal to a first command to navigate through or select an item in a graphical display of content provided by a head-mountable device (HMD). Still further, the method may comprise associating the second signal to a subsequent command, based at least in part on a given output of the first command, to navigate through or select another item in the graphical display of content.

In another aspect, a non-transitory computer readable memory having stored therein instructions executable by a wearable computing device to cause the wearable computing device to perform functions is described. The functions may comprise receiving a first signal indicative of a detected eye gesture of a first eye. The functions may also comprise receiving a second signal indicative of a detected eye gesture of a second eye. The functions may further comprise associating the first signal to a first command to navigate through or select an item in a graphical display of content provided by the wearable computing device. Still further, the functions may comprise associating the second signal to a subsequent command, based on a given output of the first command, to navigate through or select another item in the graphical display of content.

In yet another aspect, a system is described. The system may include a head-mountable device (HMD). The system may also include a processor coupled to the HMD. The processor may be configured to receive a first signal from a first sensor coupled to the HMD, wherein the first sensor may be configured to detect an eye gesture of a first eye. The processor may also be configured to receive a second signal from a second sensor coupled to the HMD, wherein the second sensor is configured to detect an eye gesture of a second eye. The processor may be further configured to cause the HMD to provide a graphical display of content. Still further, the processor may be configured to associate the first signal to a first command to navigate through or select an item in the graphical display of content. Yet still further, the processor may be configured to associate the second signal to a subsequent command, based at least in part on a given output of the first command, to navigate through or select another item in the graphical display of content of the HMD.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 6A-6D illustrate examples of an implementation of a head-mountable device in accordance with an example method.

DETAILED DESCRIPTION

Figure 1A:
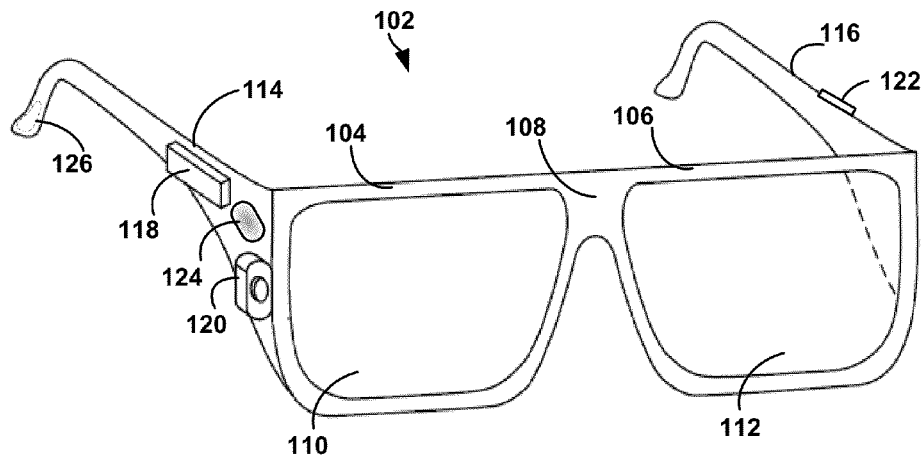
FIG. 1A illustrates an example head-mountable device.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The disclosure generally describes a head-mountable device (HMD), sometimes referred to as a head-mountable display, and in particular, an HMD that may have at least a first sensor and a second sensor in which the first sensor may be configured to detect an eye gesture of a first eye of a wearer of the HMD and the second sensor may be configured to detect an eye gesture of a second eye of the wearer of the HMD. A first signal may be received by the first sensor, and the first signal may be associated to a first command to navigate through or select an item in the graphical display of content provided by the HMD. A second signal may be received by the second sensor, and the second signal may be associated to a subsequent command, of which possibilities are based at least in part on a given output of the first command, to navigate through or select another item in the graphical display of content.

An example HMD may also employ one or more additional sensors configured to track an eye gaze of one or both eyes of the wearer. The additional sensors may be configured to receive signals representative of a variety of eye gazes. The received signals may be associated to one or more respective commands, of which possibilities are based at least in part on the given output of the first command, to navigate through or select another item in the graphical display of content. In some examples, the one or more respective commands may be based at least in part on a given output of any previously associated signal/command. Further, an example HMD may employ one or more sensors configured to detect a movement of the wearer. Received signals representative of the movement of the head of the wearer, for example, may be associated to one or more respective commands to navigate through or select another item in the graphical display of content.

Systems and devices in which example embodiments may be implemented will now be described in greater detail. In general, an example system may be implemented in or may take the form of a wearable computer (i.e., a wearable-computing device). In an example embodiment, a wearable computer takes the form of or includes an HMD. However, a system may also be implemented in or take the form of other devices, such as a mobile phone, among others. Further, an example system may take the form of non-transitory computer readable medium, which has program instructions stored thereon that are executable by a processor to provide functionality described herein. Thus, an example system may take the form of a device such as a wearable computer or mobile phone, or a subsystem of such a device, which includes such a non-transitory computer readable medium having such program instructions stored thereon.

In a further aspect, an HMD may generally be or include any display device that is worn on the head and places a display in front of one or both eyes of the wearer. An HMD may take various forms such as a helmet or eyeglasses. Further, features and functions described in reference to "eyeglasses" herein may apply equally to any other kind of HMD.

FIG. 1A illustrates an example head-mountable device (HMD) 102. In FIG. 1A, the head-mountable device 102 may also be referred to as a head-mountable display. It should be understood, however, that example systems and devices may take the form of or be implemented within or in association with other types of devices. As illustrated in FIG. 1A, the head-mountable device 102 comprises lens-frames 104, 106, a center frame support 108, and lens elements 110, 112 which comprise a front portion of the head-mountable device, and two rearward-extending side portions 114, 116 (hereinafter referred to as "side-arms"). The center frame support 108 and the side-arms 114, 116 are configured to secure the head-mountable device 102 to a user's face via a user's nose and ears, respectively.

Each of the frame elements 104, 106, and 108 and the side-arms 114, 116 may be formed of a solid structure of plastic and/or metal, or may be formed of a hollow structure of similar material so as to allow wiring and component interconnects to be internally routed through the head-mountable device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these features of the lens elements may facilitate an augmented reality or heads-up display where the projected image or graphic is superimposed over a real-world view as perceived by the user through the lens elements 100, 112.

The side-arms 114, 116 may each be projections that extend away from the lens-frames 104, 106, respectively, and may be positioned behind a user's ears to secure the head-mountable device 102 to the user. The side-arms 114, 116 may further secure the head-mountable device 102 to the user by extending around a rear portion of the user's head. Additionally or alternatively, for example, the HMD 102 may connect to or be affixed within a head-mountable helmet structure. Other possibilities exist as well.

The HMD 102 may also include an on-board computing system 118, a video camera 120, a sensor 122, and a finger-operable touch pad 124. The on-board computing system 118 is shown to be positioned on the extending side-arm 114 of the head-mountable device 102; however, the on-board computing system 118 may be provided on other parts of the head-mountable device 102 or may be positioned remote from the head-mountable device 102 (e.g., the on-board computing system 118 could be wire- or wirelessly-connected to the head-mountable device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mountable device 102; however, the video camera 120 may be provided on other parts of the head-mountable device 102. The video camera 120 may be configured to capture images at various resolutions or at different frame rates. Many video cameras with a small form-factor, such as those used in cell phones or webcams, for example, may be incorporated into an example of the HMD 102.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mountable device 102; however, the sensor 122 may be positioned on other parts of the head-mountable device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mountable device 102. However, the finger-operable touch pad 124 may be positioned on other parts of the head-mountable device 102. Also, more than one finger-operable touch pad may be present on the head-mountable device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, a vibration transducer 126 is shown to be embedded in the right side-arm 114. The vibration transducer 126 may be configured to function as bone-conduction transducer (BCT), which may be arranged such that when the HMD 102 is worn, the vibration transducer 126 is positioned to contact the wearer behind the wearer's ear. Additionally or alternatively, the vibration transducer 126 may be arranged such that the vibration transducer 126 is positioned to contact a front of the wearer's ear. In an example embodiment, the vibration transducer 126 may be positioned to contact a specific location of the wearer's ear, such as the tragus. Other arrangements of vibration transducer 126 are also possible. The vibration transducer 126 may be positioned at other areas on the HMD 102 or embedded within or on an outside surface of the HMD 102.

Yet further, the HMD 102 may include at least one audio source (not shown) that is configured to provide an audio signal that drives vibration transducer 126. For instance, in an example embodiment, the HMD 102 may include a microphone, an internal audio playback device such as an on-board computing system that is configured to play digital audio files, and/or an audio interface to an auxiliary audio playback device, such as a portable digital audio player, smartphone, home stereo, car stereo, and/or personal computer. The interface to an auxiliary audio playback device may be a tip, ring, sleeve (TRS) connector, or may take another form. Other audio sources and/or audio interfaces are also possible.

Figure 1B:
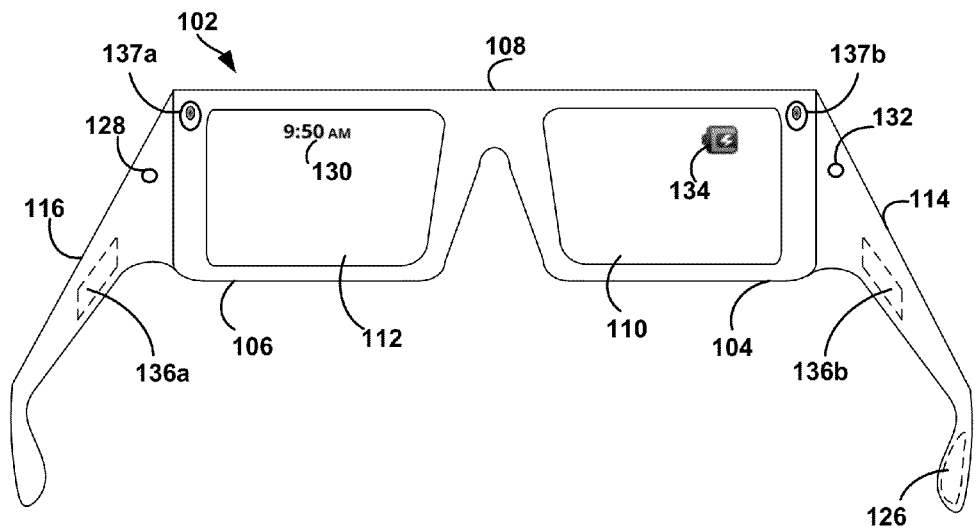
FIG. 1B illustrates an alternate view of the head-mountable device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

In a further aspect, additionally or alternatively to the vibration transducer 126, the HMD 102 may include vibration transducers 136a, 136b, at least partially enclosed in the left side-arm 116 and the right side-arm 114, respectively. The vibration transducers 136a, 136b may be arranged such that vibration transducers 136a, 136b are positioned to contact the wearer at one or more locations near the wearer's temple. Other arrangements of vibration transducers 136a, 136b are also possible.

In yet another aspect, the HMD 102 may include one or more infrared proximity sensors 137a, 137b configured to detect an eye gesture of the left eye of the wearer and/or an eye gesture of the right eye of the wearer. In an example embodiment, the infrared proximity sensors 137a, 137b may be coupled to the left and right lens elements 110, 112 and positioned at an appropriate distance from the eyes of the wearer so as to optimally detect the wearer's eye gestures. Additionally or alternatively, the HMD 102 may include one or more cameras (not shown) coupled and positioned similarly to the one or more infrared proximity sensors and may be configured to detect eye gestures of the wearer's eyes. Further, the cameras may be configured to detect a gaze of the wearer's eye. In some examples, the HMD 102 may include one or more infrared photodiodes configured to detect eye gestures and/or eye gazes. Other examples are possible.

Figure 1C:
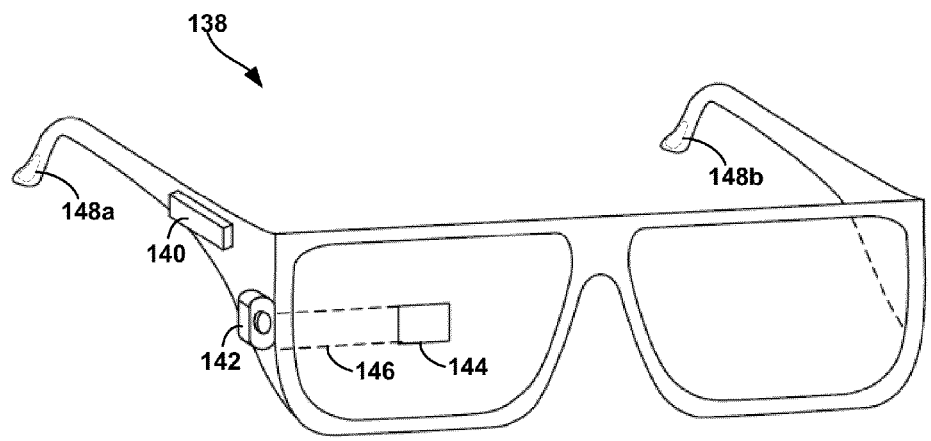
FIG. 1C illustrates another example head-mountable device.

FIG. 1C illustrates another example head-mountable device which takes the form of an HMD 138. The HMD 138 may include frame elements and side-arms such as those described with respect to FIGS. 1A and 1B. The HMD 138 may additionally include an on-board computing system 140 and a video camera 142, such as those described with respect to FIGS. 1A and 1B. The video camera 142 is shown mounted on a frame of the HMD 138. However, the video camera 142 may be mounted at other positions as well.

As shown in FIG. 1C, the HMD 138 may include a single display 144 which may be coupled to the device. The display 144 may be formed on one of the lens elements of the HMD 138, such as a lens element described with respect to FIGS. 1A and 1B, and may be configured to overlay computer-generated graphics in the user's view of the physical world. The display 144 is shown to be provided in a center of a lens of the HMD 138, however, the display 144 may be provided in other positions. The display 144 is controllable via the computing system 140 that is coupled to the display 144 via an optical waveguide 146.

In a further aspect, the HMD 138 includes vibration transducers 148a-b at least partially enclosed in the left and right side-arms of the HMD 138. In particular, each vibration transducer 148a-b functions as a bone-conduction transducer, and is arranged such that when the HMD 138 is worn, the vibration transducer is positioned to contact a wearer at a location behind the wearer's ear. Additionally or alternatively, the vibration transducers 148a-b may be arranged such that the vibration transducers 148 are positioned to contact the front of the wearer's ear.

Further, in an embodiment with two vibration transducers 148a-b, the vibration transducers may be configured to provide stereo audio. As such, the HMD 138 may include at least one audio source (not shown) that is configured to provide stereo audio signals that drive the vibration transducers 148a-b.

Figure 1D:
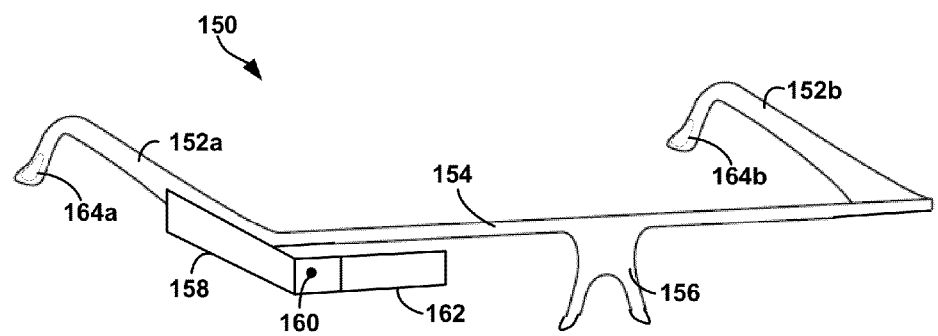
FIG. 1D illustrates another example head-mountable device.

FIG. 1D illustrates another example head-mountable device which takes the form of an HMD 150. The HMD 150 may include side-arms 152a-b, a center frame support 154, and a nose bridge 156. In the example shown in FIG. 1D, the center frame support 154 connects the side-arms 152a-b. The HMD 150 does not include lens-frames containing lens elements. The HMD 150 may additionally include an on-board computing system 158 and a video camera 160, such as those described with respect to FIGS. 1A and 1B.

The HMD 150 may include a single lens element 162 that may be coupled to one of the side-arms 152a-b or the center frame support 154. The lens element 162 may include a display such as the display described with reference to FIGS. 1A and 1B, and may be configured to overlay computer-generated graphics upon the user's view of the physical world. In one example, the single lens element 162 may be coupled to the inner side (i.e., the side exposed to a portion of a user's head when worn by the user) of the extending side-arm 152a. The single lens element 162 may be positioned in front of or proximate to a user's eye when the HMD 150 is worn by a user. For example, the single lens element 162 may be positioned below the center frame support 154, as shown in FIG. 1D.

In a further aspect, HMD 150 includes vibration transducers 164a-b, which are respectively located on the left and right side-arms of HMD 150. The vibration transducers 164a-b may be configured in a similar manner as the vibration transducers 148a-b on HMD 138.

The arrangements of components included in the HMD 102, 138, 150 of FIGS. 1A-1D are not limited to those that are described and shown with respect to FIGS. 1A-1D. Additional or alternative arrangements are also possible.

Figure 2A:
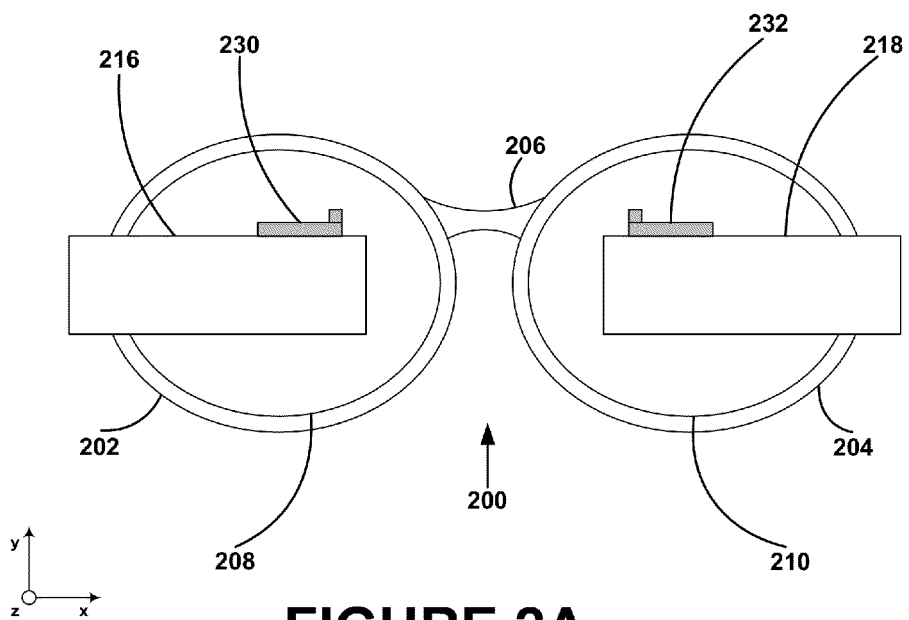
FIG. 2A illustrates a front view of an example head-mountable device.
Figure 2B:
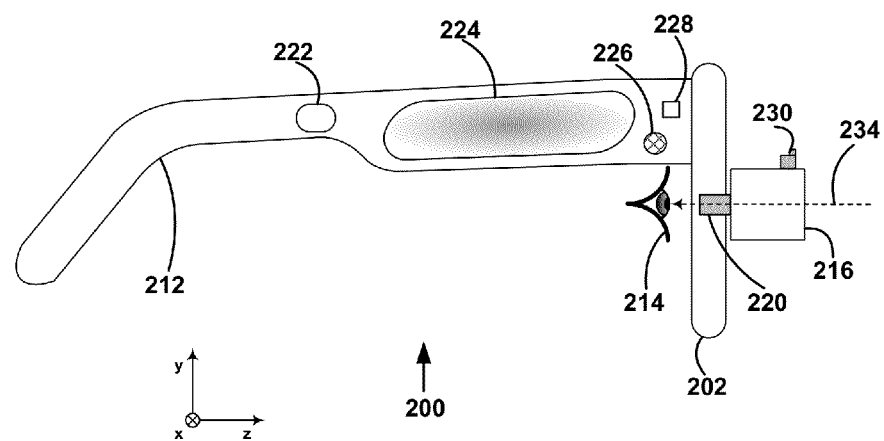
FIG. 2B illustrates a side view of the example head-mountable device.

FIG. 2A illustrates a front view of another example head-mountable device (HMD). FIG. 2B illustrates a side view of the example HMD in FIG. 2A. FIGS. 2A and 2B will be described together. Although this example embodiment is provided in an eyeglasses format, it will be understood that wearable systems and HMDs may take other forms, such as hats, goggles, masks, headbands and helmets. The HMD 200 includes lens frames 202 and 204, a center frame support 206, lens elements 208 and 210, and an extending side-arm 212 that may be affixed to the lens frame 202. There may be another extending side arm affixed to the lens frame 204 but is not shown. The center frame support 206 and side-arm 212 may be configured to secure the HMD 200 to a head of a wearer via a nose and an ear of the wearer. Each of the frame elements 202, 204, and 206 and the extending side-arm 212 may be formed of a solid structure of plastic or metal, or may be formed of a hollow structure of similar material so as to allow wiring and component interconnects to be internally routed through the HMD 200. Lens elements 208 and 210 may be at least partially transparent so as to allow the wearer to look through lens elements. In particular, a right eye 214 of the wearer may look through right lens 210. Optical systems 216 and 218 may be positioned in front of lenses 208 and 210, respectively. The optical systems 216 and 218 may be attached to the HMD 200 using support mounts such as 220 shown for the right optical system 216. Furthermore, the optical systems 216 and 218 may be integrated partially or completely into lens elements 208 and 210, respectively.

Although FIG. 2A illustrates an optical system for each eye, the HMD 200 may include an optical system for only one eye (e.g., right eye 214). The wearer of the HMD 200 may simultaneously observe from optical systems 216 and 218 a real-world image with an overlaid displayed image. The HMD 200 may include various elements such as a processor 222, a touchpad 224, a microphone 226, and a button 228. The processor 222 may use data from, among other sources, various sensors and cameras to determine a displayed image that may be displayed to the wearer. The HMD 200 may also include eye tracking systems 230 and 232 that may be integrated into the optical systems 216 and 218, respectively, and may be configured to detect and/or track an eye gesture of the wearer or an eye gaze of the wearer. The location of eye tracking systems 230 and 232 is for illustration only. The eye tracking systems 230 and 232 may be positioned in different locations and may be separate or attached to the HMD 200. A gaze axis or direction 234 associated with the eye 214 may be shifted or rotated with respect to the optical system 216 or eye tracking system 230 depending on placement of the HMD 200 on the nose and ears of the wearer. The eye-tracking systems 230 and 232 may include hardware such as an infrared camera and at least one infrared light source, but may include other components also. In one example, an infrared light source or sources integrated into the eye tracking system 230 may illuminate the eye 214 of the wearer, and a reflected infrared light may be collected with an infrared camera to track eye or eye-pupil movement. Those skilled in the art would understand that other user input devices, user output devices, wireless communication devices, sensors, and cameras may be reasonably included in such a wearable computing system.

Figure 3:
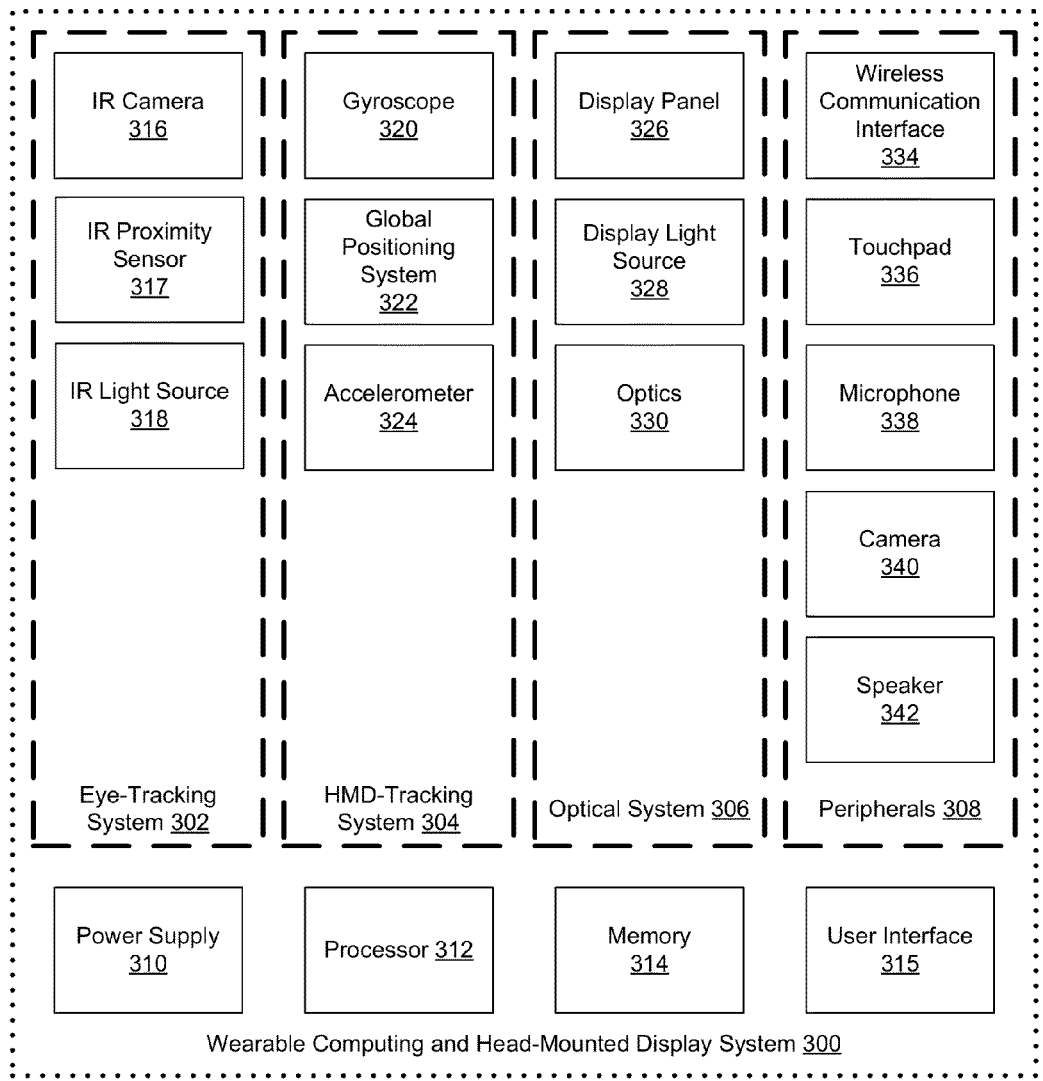
FIG. 3 is a block diagram of an example wearable computing system.

FIG. 3 is a block diagram of an example wearable computing system 300 that may include several different components and subsystems, each of which may be an optional component and included depending on an application or use of the wearable computing system 300. Components coupled to or included in the system 300 may include an eye-tracking system 302, a HMD-tracking system 304, an optical system 306, peripherals 308, a power supply 310, a processor 312, a memory 314, and a user interface 315. Components of the system 300 may be configured to work in an interconnected fashion with each other and/or with other components coupled to respective systems. For example, the power supply 310 may provide power to all the components of the system 300. The processor 312 may receive information from and control the eye tracking system 302, the HMD-tracking system 304, the optical system 306, and peripherals 308. The processor 312 may be configured to execute program instructions stored in the memory 314 and to generate a display of images on the user interface 315.

The eye-tracking system 302 may include hardware such as an infrared camera 316, at least one infrared proximity sensor 317, and at least one infrared light source 318. The infrared camera 316 may be utilized by the eye-tracking system 302 to capture images of an eye of the wearer. The images may include either video images or still images or both. The images obtained by the infrared camera 316 regarding the eye of the wearer may help determine where the wearer may be looking within a field of view of the HMD included in the system 300, for instance, by ascertaining a location of the eye pupil of the wearer. The infrared camera 316 may include a visible light camera with sensing capabilities in the infrared wavelengths.

The at least one infrared proximity sensor 317 may be configured to emit an electromagnetic field or an electromagnetic radiation, such as infrared, towards its target (e.g., an eye of the wearer, or more specifically, an eye pupil of a wearer) and detect any changes in the field or returned signal that would result, for example, from the wearer blinking an eye, the wearer closing an eye for a period of time longer than that of a blink, or other types of eye gestures. Other types of sensors may be used to detect eye gestures as well.

The infrared light source 318 may include one or more infrared light-emitting diodes or infrared laser diodes that may illuminate a viewing location, i.e. an eye of the wearer. Thus, one or both eyes of a wearer of the system 300 may be illuminated by the infrared light source 318. The infrared light source 318 may be positioned along an optical axis common to the infrared camera, and/or the infrared light source 318 may be positioned elsewhere. The infrared light source 318 may illuminate the viewing location continuously or may be turned on at discrete times.

The HMD-tracking system 304 may include a gyroscope 320, a global positioning system (GPS) 322, and an accelerometer 324. The HMD-tracking system 304 may be configured to provide information associated with a position and an orientation of the HMD to the processor 312. Further, the HMD-tracking system 304 may be configured to provide information associated with a change of position and/or orientation of the HMD so as to detect a movement of the HMD. The gyroscope 320 may include a microelectromechanical system (MEMS) gyroscope or a fiber optic gyroscope as examples. The gyroscope 320 may be configured to provide orientation information to the processor 312. The GPS unit 322 may include a receiver that obtains clock and other signals from GPS satellites and may be configured to provide real-time location information to the processor 312. The HMD-tracking system 304 may further include an accelerometer 324 configured to provide motion input data to the processor 312.

The optical system 306 may include components configured to provide images to a viewing location, i.e. an eye of the wearer. The components may include a display panel 326, a display light source 328, and optics 330. These components may be optically and/or electrically-coupled to one another and may be configured to provide viewable images at a viewing location. One or two optical systems 306 may be provided in the system 300. In other words, the HMD wearer may view images in one or both eyes, as provided by one or more optical systems 306. Also, the optical system(s) 306 may include an opaque display and/or a see-through display coupled to the display panel 326, which may allow a view of the real-world environment while providing superimposed virtual images. The infrared camera 316 coupled to the eye tracking system 302 may be integrated into the optical system 306.

Additionally, the system 300 may include or be coupled to peripherals 308, such as a wireless communication interface 334, a touchpad 336, a microphone 338, a camera 340, and a speaker 342. Wireless communication interface 334 may use 3G cellular communication, such as CDMA, EVDO, GSM/GPRS, or 4G cellular communication, such as WiMAX or LTE. Alternatively, wireless communication interface 334 may communicate with a wireless local area network (WLAN), for example, using WiFi. In some examples, wireless communication interface 334 may communicate directly with a device, for example, using an infrared link, Bluetooth, near field communication, or ZigBee.

The power supply 310 may provide power to various components in the system 300 and may include, for example, a rechargeable lithium-ion battery. Various other power supply materials and types known in the art are possible.

The processor 312 may execute instructions stored in a non-transitory computer readable medium, such as the memory 314, to control functions of the system 300. Thus, the processor 312 in combination with instructions stored in the memory 314 may function as a controller of system 300. For example, the processor 312 may control the wireless communication interface 334 and various other components of the system 300. In other examples, the processor 312 may include a plurality of computing devices that may serve to control individual components or subsystems of the system 300. Analysis of the images obtained by the infrared camera 316 may be performed by the processor 312 in conjunction with the memory 314.

In addition to instructions that may be executed by the processor 312, the memory 314 may store data that may include a set of calibrated wearer eye gesture durations and a collection of past eye gesture durations (e.g., a duration of time). Eye gesture durations may include, for instance, information regarding durations of time during which a wearer closed an eye. For example, an eye gesture such as a blink may include a duration of time less than 300 milliseconds. As another example, an eye gesture such as a wink may include a duration of time ranging from 1 to 5 seconds. As yet another example, an eye gesture may include a duration of time that exceeds 5 seconds. Other examples are possible. Further, in addition to sets of calibrated wearer eye gestures and collections of past eye gesture durations, the memory 314 may store data that may include a set of calibrated wearer eye pupil positions and a collection of past eye pupil positions. Thus, the memory 314 may function as a database of information related to gaze direction. Calibrated wearer eye pupil positions may include, for instance, information regarding extents or range of an eye pupil movement (right/left and upwards/downwards), and relative position of eyes of the wearer with respect to the HMD. For example, a relative position of a center and corners of an HMD screen with respect to a gaze direction or a gaze angle of the eye pupil of the wearer may be stored. Also, locations or coordinates of starting and ending points, or waypoints, of a path of a moving object displayed on the HMD, or of a static path (e.g., semicircle, Z-shape etc.) may be stored on the memory 314.

The system 300 may further include the user interface 315 for providing information to the wearer or receiving input from the wearer. The user interface 315 may be associated with, for example, displayed images, a touchpad, a keypad, buttons, a microphone, and/or other peripheral input devices. The processor 312 may control functions of the system 300 based on input received through the user interface 315. For example, the processor 312 may utilize user input from the user interface 315 to control how the system 300 may display images within a field of view or may determine what images the system 300 may display.

Although FIG. 3 shows various components of the system 300 (i.e., wireless communication interface 334, processor 312, memory 314, infrared camera 316, display panel 326, GPS 322, and user interface 315) as being integrated into the system 300, one or more of the described functions or components of the system 300 may be divided up into additional functional or physical components, or combined into fewer functional or physical components. For example, the infrared camera 316 may be mounted on the wearer separate from the system 300. Thus, the system 300 may be part of a wearable computing device in the form of separate devices that can be worn on or carried by the wearer. Separate components that make up the wearable computing device may be communicatively coupled together in either a wired or wireless fashion. In some further examples, additional functional and/or physical components may be added to the examples illustrated by FIG. 3. In other examples, the system 300 may be included within other systems.

The system 300 may be configured as, for example, eyeglasses, goggles, a helmet, a hat, a visor, a headband, or in some other form that can be supported on or from a head of the wearer. The system 300 may be further configured to display images to both eyes of the wearer. Alternatively, the system 300 may display images to only one eye, either a left eye or a right eye.

Figure 4A:
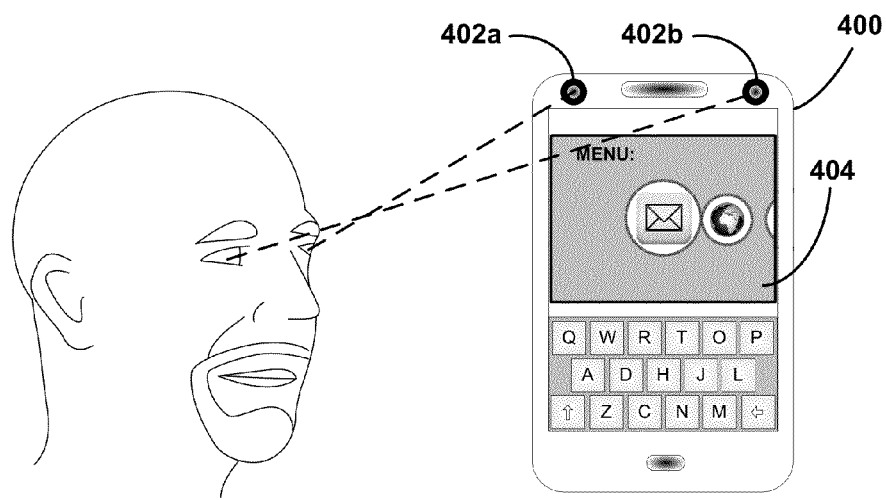
FIGS. 4A-4B illustrate examples of a computing device in accordance with an example method.
Figure 4B:
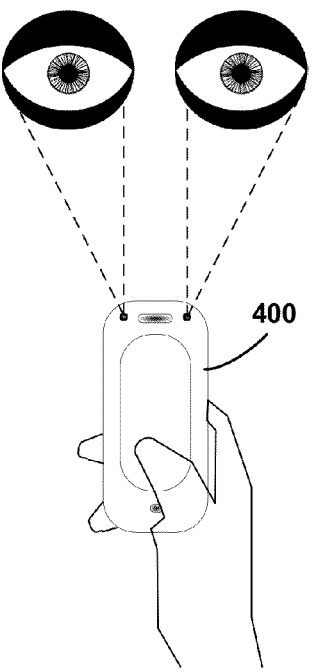

FIGS. 4A-4B illustrate examples of a computing device 400 in accordance with an example method. As shown in the figures, the computing device 400 may be a device other than a head-mountable device, such as a mobile phone, among others. The computing device 400 may include one or more sensors 402a-b configured to detect eye gestures of a first eye and a second eye of a wearer. The sensors 402a-b Further, whereas a graphical display of content may be projected to the wearer on one or more lens elements coupled to the head-mountable computing device, the computing device 400 may include a graphical display of content 404 projected to the wearer on a screen, such as a liquid crystal display (LCD) of a mobile phone. In one example, a left sensor 402a may be configured to detect an eye gesture of a left eye of a wearer, and a right sensor 402b may be configured to detect an eye gesture of a right eye of the wearer. Signals received from the sensors 402a-b may then be associated with one or more commands to navigate through or select an item in the graphical display of content 404. In other examples, the sensors 402a-b may be configured to track an eye gaze of an eye of a wearer. In still other examples, the computing device 400 may include one or more of the components described in FIGS. 2 and 3, such as an infrared camera and/or an accelerometer, which may function in accordance with the example method. Other examples are also possible.

Figure 5:
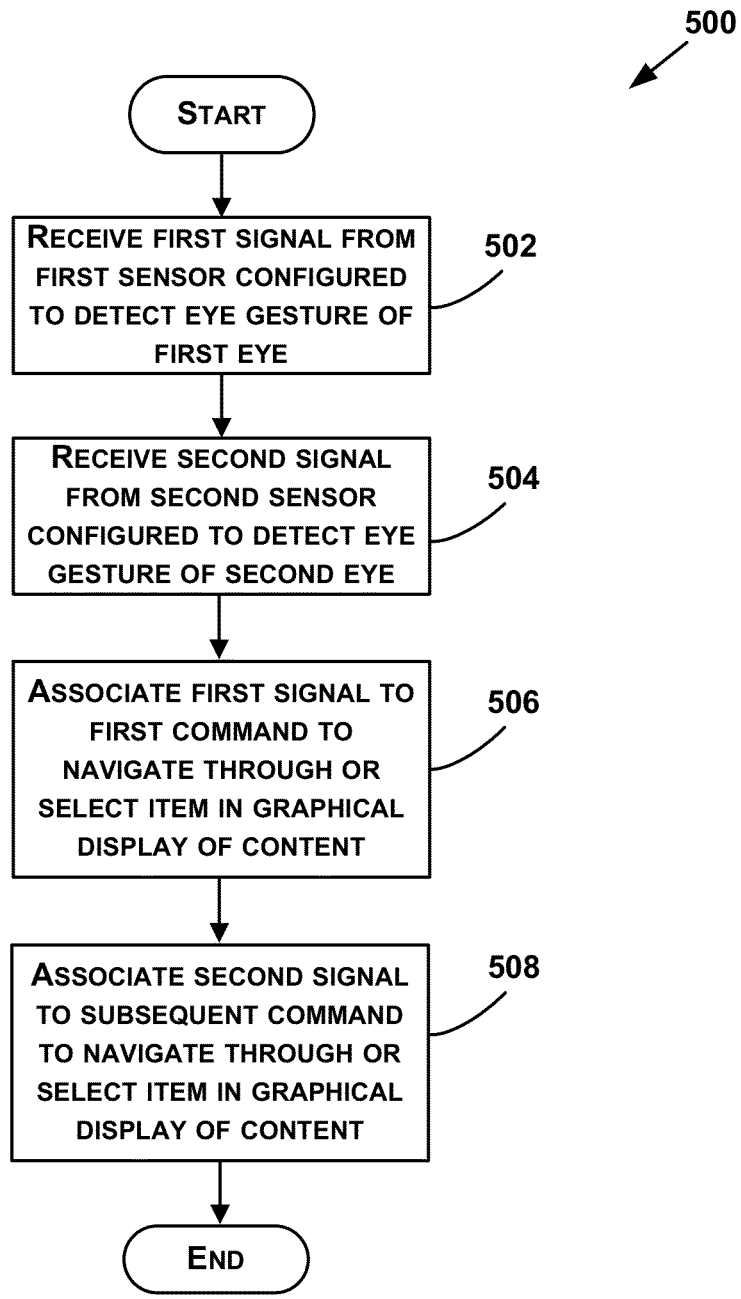
FIG. 5 depicts a flow chart of an example method of using a head-mountable device.

FIG. 5 depicts a flow chart of an example method 500 of using a head-mountable device. Method 500 shown in FIG. 5 presents an example of a method that could be used with any of the example systems described in the figures, and may be performed by a device, such as a head-mountable device or any devices illustrated in FIGS. 1-8C, or components of the devices. Method 500 may include one or more operations, functions, or actions as illustrated by one or more of blocks 502-508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Furthermore, for the method 500 and other processes and methods disclosed herein, each block in FIG. 4 may represent circuitry that is wired to perform the specific logical functions in the process.

Initially, at block 502, the method 500 includes receiving a first signal from a first sensor configured to detect an eye gesture of a first eye. The first signal may be received by a processor or other component included in an HMD system via wireless or wired connection to the first sensor. The first sensor may include one or more IR proximity sensors coupled to an HMD pointed at a first eye of a wearer of the HMD. Additionally or alternatively, the first sensor may include other hardware configured to detect eye gestures, such as a low-resolution camera, for example. In another example, the first signal may be received from another component coupled to the head-mountable device configured to detect an eye gesture rather than from the first sensor. In yet another example, the first sensor (or component) may be configured to detect an eye gaze of a wearer. Other examples are also possible.

At block 504, the method 500 includes receiving a second signal from a second sensor configured to detect an eye gesture of a second eye. The second signal may be received by a processor or other component included in an HMD system via wireless or wired connection to the second sensor. The second sensor may include one or more IR proximity sensors coupled to an HMD pointed at a second eye of a wearer of the HMD. Additionally or alternatively, the second sensor may include other hardware configured to detect eye gestures, such as a low-resolution camera, for example. In another example, the second signal may be received from another component coupled to the head-mountable device configured to detect an eye gesture rather than from the second sensor. In yet another example, the second sensor (or component) may be configured to detect an eye gaze of a wearer. Other examples are also possible.

At block 506, the method 500 includes associating the first signal to a first command to navigate through or select an item in a graphical display of content. The graphical display of content may be projected to the wearer on one or more lens elements coupled to the HMD. Alternatively, previously displayed content may be updated based on the first command associated with the first signal so as to display new content.

At block 508, the method 500 includes associating the second signal to a subsequent command to navigate through or select an item in a graphical display of content. In some examples, the subsequent command may be based at least in part on a given output of the first command. The displayed content may then be updated based on the second command associated with the second signal so as to display new content.

In some examples, a third signal may be received. The third signal may be received from a third sensor, such as a sensor similar to the first sensor and the second sensor. Alternatively, the third signal may be received from another component coupled to the HMD, such as an accelerometer. The third signal may then be associated to a respective command, of which possibilities are based at least in part on the given output of the first command, to navigate through or select another item in the graphical display of content. Additionally or alternatively, the respective command may be based at least in part on the given output of the second command. In other examples, the third sensor may be received from either the first or the second sensor. Other examples are also possible.

Subsequent signals may also be received from one or more components coupled to the HMD. The subsequent signals may each be associated to respective commands, of which possibilities may be based at least in part on at least one given output of one or more preceding commands. FIGS. 6A-6D, 7A-7B, and 8A-8C illustrate various implementations of the example method 500. The examples described herein may take other forms without departing from the scope of the invention.

FIGS. 6A-6D illustrate examples of an implementation of a HMD 600 in accordance with the example method 500 of FIG. 5. A portion 600 of the HMD is shown, and the portion 600 may include a graphical display of content projected to a wearer. For example, the graphical display of content 602 may include a menu of items (e.g., one or more contextual menu actions). A first sensor (not shown) may be coupled to the HMD and the first sensor may be configured to detect an eye gesture of a left eye 604L of the wearer. Even further, a second sensor (not shown) may be coupled to the HMD and the second sensor may be configured to detect an eye gesture of a right eye 604R of the wearer.

A first signal received by the first sensor may be representative of a close of the left eye 604L of the wearer for a time period detected by the first sensor. The first signal may then be associated to a first command to navigate through the menu of items in the graphical display of content. As shown in FIG. 6B, a particular item in the menu of items in the graphical display of content 612 may become enlarged to indicate to the wearer that a particular item is selectable by the wearer. Other methods may also be used to indicate to the wearer that a particular item is selectable.

The first command may allow the wearer to engage in a "hover" state, in which the wearer "hovers" on a particular item in the menu of items until the wearer decides to either select the particular item, or navigate to another item. In some examples, while the wearer is engaged in the "hover" state, additional information regarding the particular item may appear to the wearer so long as the wearer is hovering on the particular item. In other examples, the wearer may engage in the "hover" state when one or more particular eye gestures (or gazes) are recognized. In still other examples, the wearer may simply keep one eye open for a time period in order to engage in the "hover" state. Other examples are also possible.

For the time period that the left eye 604L of the wearer remains closed, the wearer may have the option to navigate through the menu of items. A second signal may then be received by the second sensor, and the second signal may be representative of a blink of the right eye 604R of the wearer. The second signal may then be associated to a subsequent command to navigate through the menu of items in the graphical display of content 622, as shown in FIG. 6C. For example, while the left eye 604L of the wearer remains closed and the wearer is hovering on a first item in the menu of items, a blink of the right eye of the wearer 604R may allow the wearer to hover on a subsequent item in the menu of items, as shown in FIG. 6C. Further, a subsequent blink of the right eye 604R following the previous blink may allow the wearer to hover on yet another item in the menu of items.

In some examples, while a first eye remains closed, the wearer may navigate forwards through a menu of items by repeatedly blinking a second eye. In other examples, another signal may be received from the second sensor, and the signal may be representative of a close of the right eye 604R for a time period in which the time period exceeds that of a blink so as to distinguish between the two different eye gestures. Further, the signal may be associated to a command to navigate backwards through the menu of items (e.g., moving back one item per close of the right eye for the time period). In still other examples, yet another signal may be received from the first sensor and/or the second sensor, and the signal may be associated to a command to display entirely new content (e.g., exiting a current menu of items and entering a previous menu of items). In still other examples, yet another signal may be received from another sensor configured to detect a head movement of the wearer, such as a gyroscope and/or an accelerometer. The signal may be associated with a command to navigate through the menu of items in the graphical display of content via various head movements (e.g., tilting the head up or down, or turning the head left or right). Other examples are also possible.

While the wearer is hovering on a particular item in the menu of items, the wearer may then open the left eye 604L in order to select the particular item, as shown in the graphical display of content 632 in FIG. 6D, for example. In doing so, a signal may be received by the first sensor, and the signal may be representative of an open of the left eye 604L of the wearer. Selecting the particular item may then cause an entirely new graphical display of content to be projected to the wearer, in which various commands may be possible.

In some examples, the HMD may be configured to provide a non-visual response to a wearer based at least in part on the associating of a signal to a command to navigate through or select an item in a graphical display of content. The HMD may also be configured to provide one or more subsequent non-visual responses to the wearer based on one or more subsequent signals received and commands executed. The non-visual response may include a vibration of the HMD. Additionally or alternatively, the non-visual response may include the HMD emitting a sound. Other non-visual responses are also possible. Referring to FIG. 6D, a successful selection of an item in the menu of items may be indicated by a non-visual response 634 such as a quick vibration of the portion 600 of the HMD.

In some examples, a non-visual response may be localized to a given portion of a HMD. For example, a HMD may comprise a left portion and a right portion, and each portion may include at least one vibration transducer at least partially enclosed in the given portion. The vibration transducer(s) may include one or more bone conduction transducers configured to vibrate based on an audio signal, thus providing information indicative of the audio signal to the wearer via a bone structure of a wearer. Further, the vibration transducer(s) may be configured to vibrate based on a signal that is not an audio signal. In this example, one non-visual response indicative of an eye gesture of a left eye of a wearer may cause the left portion of the HMD to vibrate and/or emit a sound. Further, another non-visual response indicative of an eye gesture of a right eye of a wearer may cause the right portion of the HMD to vibrate and/or emit a sound. Other examples are also possible.

In examples similar to those described in FIGS. 6A-6D, upon recognition of a close of a first eye of a wearer, a "navigation mode" of a graphical display of content may commence in which the wearer may navigate through a graphical display of content via subsequent commands based on a sequence of eye gestures of a second eye of the wearer so long as the first eye of the wearer remains closed. An open of the first eye of the wearer may be associated with a command to select a particular item and thereby terminate the "navigation mode." In other examples, various commands may be associated with signals received by one or more sensors, in which the received signals may be representative of various eye gestures, eye gazes, head movements, etc.

Regarding eye gestures, for example, one signal may be associated with a blink of an eye, and another signal may be associated with a wink of an eye. A blink of an eye may be recognized by a particular sensor as a closing of an eye for a respective time period followed by an opening of an eye after the respective time period. Further, a wink of an eye may be recognized by a particular sensor as a closing of an eye for a time period longer than the respective time period of a blink of an eye, followed by an opening of an eye after the longer time period. A wink of an eye and a blink of an eye may also include other distinguishable characteristics. For example, an eye that is winked may include a particular shape, and an eye that is blinked may include a respective shape (e.g., a blink of an eye may include different physical characteristics than a wink of an eye). Other examples are also possible.

Figure 7B:
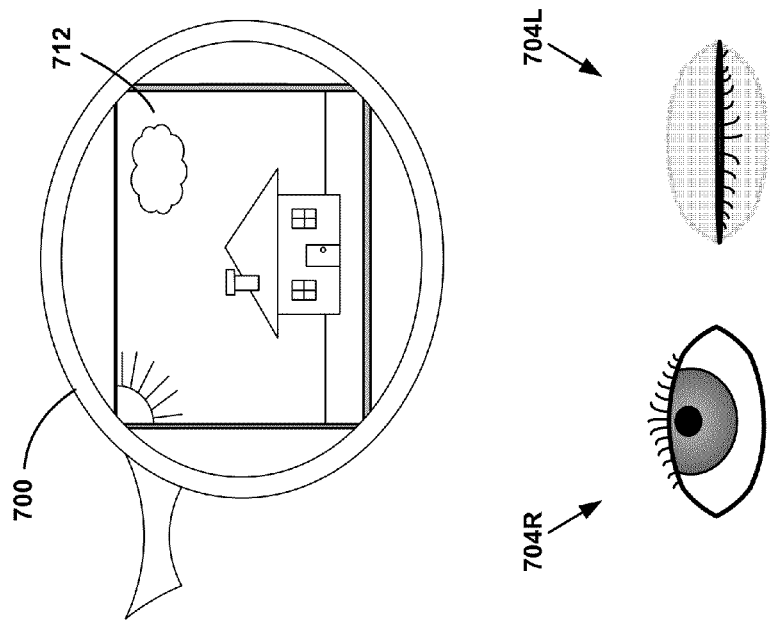
FIGS. 7A-7B illustrate other examples of an implementation of a head-mountable device in accordance with an example method.
Figure 7A:
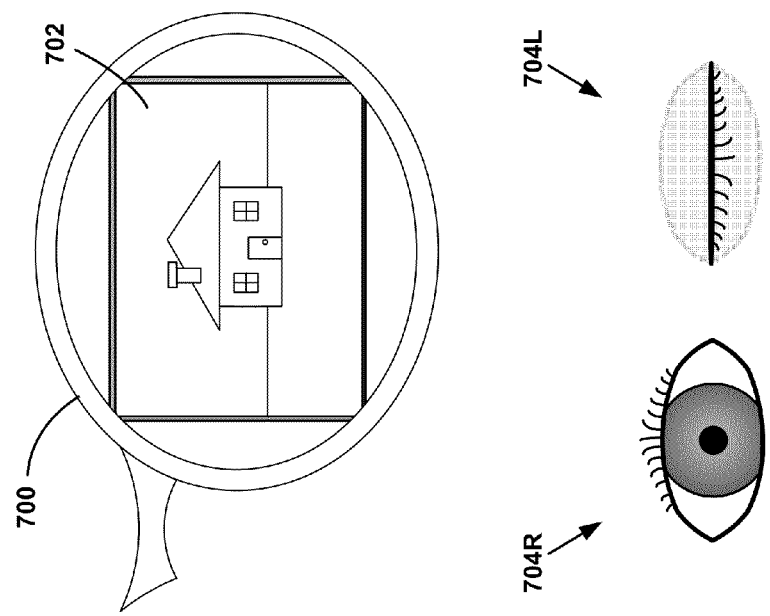

FIGS. 7A-7B illustrate other examples of an implementation of a HMD in accordance with an example method. A portion 700 of the HMD is shown, and the portion 700 may include a graphical display of content projected to a wearer. For example, the graphical display of content 702 may include an image. A first sensor (not shown) may be coupled to the HMD and the first sensor may be configured to detect an eye gesture of a left eye 704L of the wearer. Further, a second sensor (not shown) may be coupled to the HMD and the second sensor may be configured to track an eye gaze of a right eye 704R of the wearer. Still further, each individual sensor may be configured to detect eye gestures and track eye gazes. In some examples, an eye gaze of a wearer may be tracked using a location of a pupil of a wearer and/or a direction in which the pupil is facing. Other methods of tracking eye gazes are also possible.

A first signal received by the first sensor may be representative of a close of the left eye 704L of the wearer for a time period detected by the first sensor. The first signal may then be associated to a first command to "grab" the image. In some examples, keeping the left eye 704L of the wearer closed may allow the wearer to "hover" on the image, and while the wearer is engaged in the "hover" state, additional information regarding the image may appear to the wearer so long as the wearer is hovering on the image.

A second signal may then be received by the second sensor, and the second signal may be representative of a given eye gaze of the right eye 704R of the wearer. The second signal may then be associated to a subsequent command to move the image in the graphical display of content 712. For example, as shown in FIG. 7B, while the left eye 704L of the wearer remains closed, an upward gaze of the right eye 704R of the wearer, may allow the wearer to navigate the image and view an upward portion of the image that may not have been visible in the graphical display 702 initially projected to the wearer (e.g., when the image is larger than the size of the graphical display). The wearer may also be able to view other portions of the image with other eye gazes.

In some examples, other signals may be received while the left eye 704L of the wearer remains closed. A third signal (or other signal) may be received by a third sensor configured to detect a movement of the HMD. The third signal may then be associated to a movement command, of which possibilities are based at least in part on the given output of the first command, to navigate through the graphical display of content. For example, the wearer's head may turn on one or more axes so as to view portions of the "grabbed" image that may not have been visible in the graphical display initially projected to the wearer. The movement command may include a command to "pan" through the image (e.g., a rotation of the head of the wearer in a horizontal plane). Further, the movement command may include a command to "tilt" through the image (e.g., a rotation of the head of the wearer in a vertical plane). Even further, the wearer may pan or tilt at various speeds. For example, the speed of the pan or the tilt may be based at least in part on one or more commands prior to the movement command.

In other examples, the graphical display of content may include a video. The wearer may pan or tilt through a video while the video is playing. The wearer may also pause a video that is playing using one eye gesture and/or gaze, and then pan or tilt through the paused image using one or more subsequent eye gestures, eye gazes, and/or head movements. The wearer may also navigate through the video that is paused and/or playing (e.g., fast-forwarding through the video) using one or more subsequent eye gestures, eye gazes, and/or head movements. In still other examples, a video camera may be coupled to the HMD, and the wearer may initiate a recording of a video using an eye gesture. In still other examples, the graphical display of content may include an interactive map, and the wearer may navigate through or select an item (e.g., a specific location) in the map.

Figure 8B:
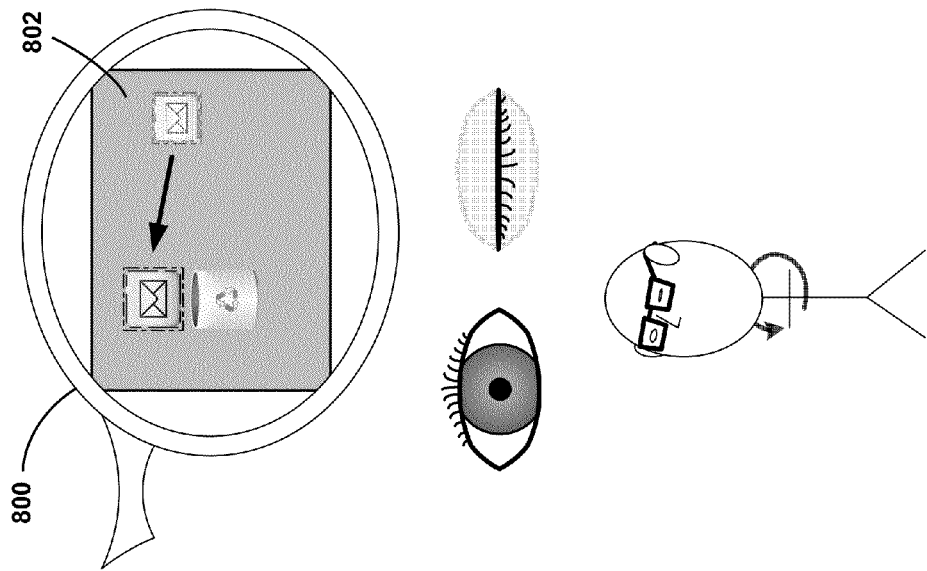
FIGS. 8A-8C illustrate other examples of an implementation of a head-mountable device in accordance with an example method.
Figure 8A:
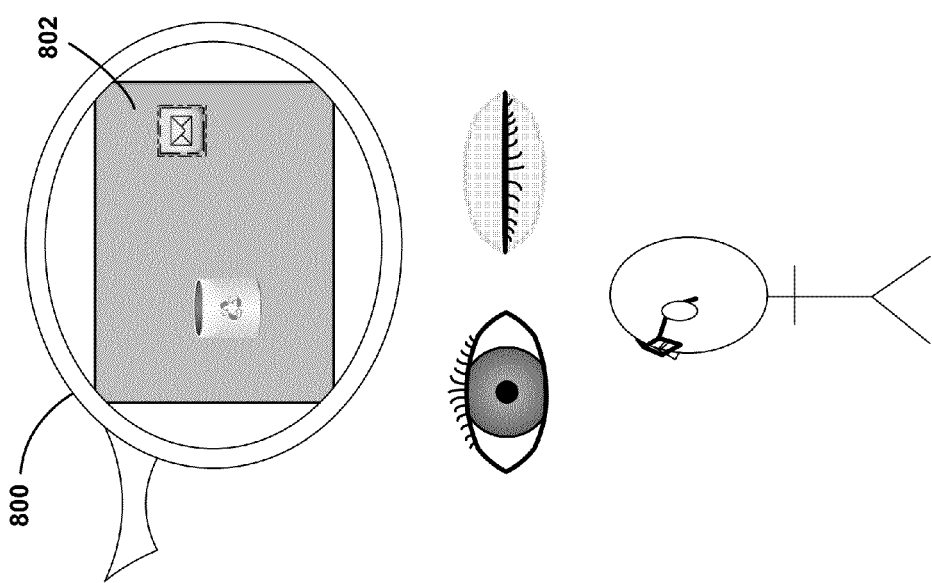
Figure 8C:
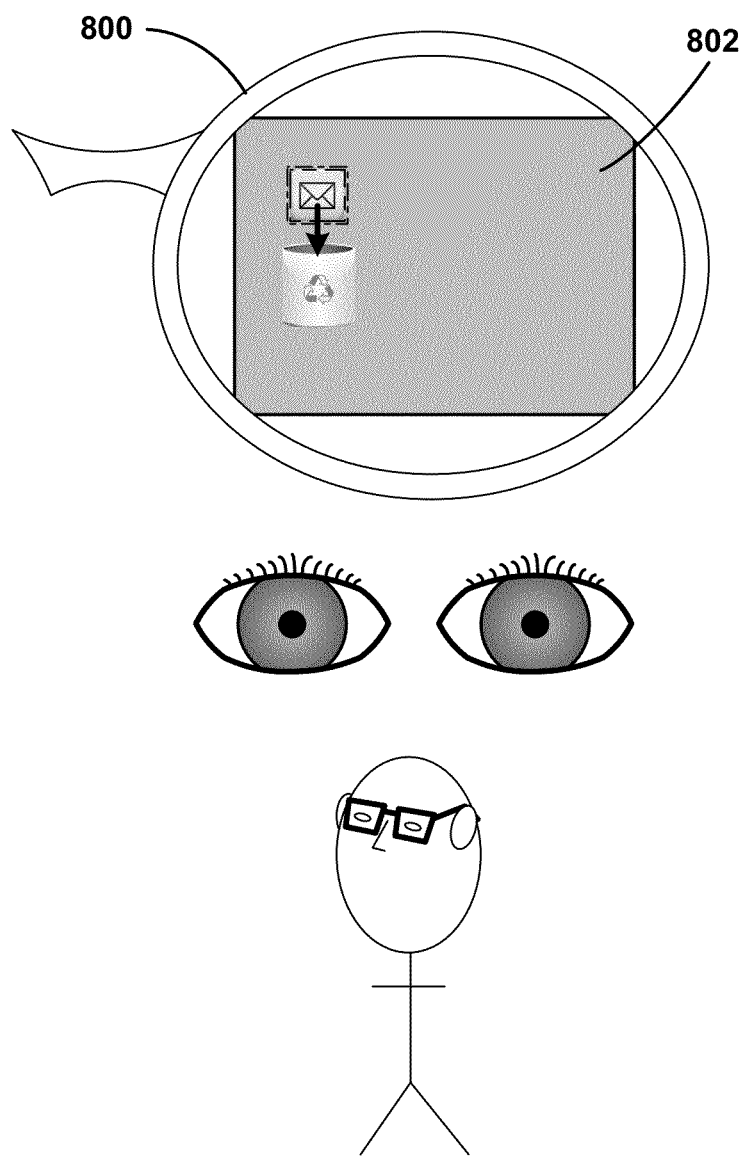

FIGS. 8A-8C illustrate other examples of an implementation of a HMD in accordance with an example method. A portion 800 of the HMD is shown, and the portion 800 may include a graphical display of content 802 projected to a wearer. For example, the graphical display of content 802 may include one or more items that the wearer may interact with, such as an "e-mail" item. A first sensor (not shown) may be coupled to the HMD and the first sensor may be configured to detect an eye gesture of a left eye the wearer and/or track an eye gaze of the left eye of the wearer. Further, a second sensor (not shown) may be coupled to the HMD and the second sensor may be configured to track an eye gaze of the right eye of the wearer and/or track an eye gaze of the right eye of the wearer. Still further, a third sensor (not shown), such as an accelerometer and/or a gyroscope, may be coupled to the HMD and the third sensor may be configured to detect a movement of the HMD.

A first signal received by the first sensor may be representative of a close of the left eye of the wearer for a time period detected by the first sensor. The first signal may then be associated to a first command to "grab" the e-mail item. In some examples, keeping the left eye of the wearer closed may allow the wearer to engage in a "grab and hold" state, and while the wearer is engaged in the "grab and hold" state, the wearer may be able to move the grabbed e-mail item so long as the left eye of the wearer remains closed.

A second signal may then be received by the second sensor, and the second signal may be representative of a movement of the HMD. The second signal may then be associated to a subsequent command to move the grabbed e-mail item in the graphical display of content 802. For example, as shown in FIG. 8B, while the left eye of the wearer remains closed, a leftward turn of the head of the wearer, may allow the emulate a "click and drag" action in which the grabbed e-mail item may be moved to a different location.

Once the grabbed email item has been moved to a particular location, the wearer may "drop" the e-mail item, thus emulating a "drag and drop" action. In some examples, another signal may be received by the first sensor in which the signal may be representative of an open of the left eye of the wearer. The signal may be associated to a command to release the grabbed e-mail item, as shown in FIG. 8C.

Various combinations of eye gestures, eye gazes, head movements, and associated commands are possible, and such combinations may be used for a variety of purposes, such as a navigation through a graphical display of content, a selection of an item in a graphical display of content, or a manipulation of an item in a graphical display of content. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A system comprising:
   at least one processor;
   a non-transitory computer-readable medium; and
   program instructions stored on the non-transitory computer-readable medium and executable by the at least one processor to:
   receive a first signal corresponding to a first eye,
   receive a second signal corresponding to a second eye,
   detect a portion of the first signal that indicates the first eye is closed,
   while the first signal indicates that the first eye is closed, responsively display a menu comprising a plurality of items on a display of a head-mountable device (HMD), wherein one of the plurality items is identified as a currently-selectable item at any given point in time, and
   while the menu is displayed:
      (i) analyze the second signal to detect for a portion of the second signal that indicates a blink of the second eye,
      (ii) in response to detection of a portion of the second signal that indicates a blink of the second eye, change which of the plurality of items is identified as the currently-selectable item, and
      (iii) in response to detection of a subsequent portion of the first signal that indicates the first eye is no longer closed, select the item that is identified as the currently-selectable item.

2. The system of claim 1, wherein a given item of the plurality of items being identified as the currently-selectable item comprises the given item being displayed as larger than the other items of the plurality of items.

3. The system of claim 1, further comprising additional program instructions stored on the non-transitory computer-readable medium and executable by the at least one processor to:
   while a given item of the plurality of items is identified as the currently-selectable item, responsively display additional information associated with the currently-selectable item on the display of the HMD.

4. The system of claim 1, further comprising additional program instructions stored on the non-transitory computer-readable medium and executable by the at least one processor to:
   in response to selecting the item that is identified as the currently-selectable item, display a subsequent menu comprising a subsequent plurality of items associated with the selected item on the display of the HMD.

5. The system of claim 1, further comprising additional program instructions stored on the non-transitory computer-readable medium and executable by the at least one processor to:
   while the menu is displayed:
      (i) analyze the second signal to detect for a portion of the second signal that indicates the second eye is closed for a predetermined period of time exceeding that of a blink, and
      (ii) in response to detection of a portion of the second signal that indicates the second eye is closed for the predetermined period of time, display a preceding menu comprising a preceding plurality of items on the display of the HMD.

6. The system of claim 1, further comprising additional program instructions stored on the non-transitory computer-readable medium and executable by the at least one processor to:
   while the menu is displayed:
      (i) analyze the second signal to detect for a portion of the second signal that indicates a direction of a gaze of the second eye, and
      (ii) in response to detection of a portion of the second signal that indicates the direction of the gaze of the second eye, change which of the plurality of items is identified as the currently-selectable item, wherein the changing occurs in a direction corresponding to the direction of the gaze of the second eye.

7. The system of claim 1, further comprising additional program instructions stored on the non-transitory computer-readable medium and executable by the at least one processor to:
   while the first signal indicates that the first eye is closed, responsively provide a non-visual response including one or more of: a vibration of the HMD and an audio source of the HMD emitting an audio response.

8. The system of claim 1, further comprising additional program instructions stored on the non-transitory computer-readable medium and executable by the at least one processor to:
   in response to changing which of the plurality of items is identified as the currently-selectable item, provide a non-visual response including one or more of: a vibration of the HMD and an audio source of the HMD emitting an audio response.

9. The system of claim 1, further comprising additional program instructions stored on the non-transitory computer-readable medium and executable by the at least one processor to:
   in response to selecting the item that is identified as the currently-selectable item, provide a non-visual response including one or more of: a vibration of the HMD and an audio source of the HMD emitting an audio response.

10. A method comprising:
   receiving, by a wearable computing device, a first signal corresponding to a first eye;
   receiving, by the wearable computing device, a second signal corresponding to a second eye;
   detecting, by the wearable computing device, a portion of the first signal that indicates the first eye is closed;
   while the first signal indicates that the first eye is closed, responsively displaying, by the wearable computing device, a menu comprising a plurality of items on a head-mountable display of the wearable computing device, wherein one of the plurality items is identified as a currently-selectable item at any given point in time; and
   while the menu is displayed:
      (i) analyzing, by the wearable computing device, the second signal to detect for a portion of the second signal that indicates a blink of the second eye,
      (ii) in response to detection of a portion of the second signal that indicates a blink of the second eye, changing, by the wearable computing device, which of the plurality of items is identified as the currently-selectable item, and
      (iii) in response to detection of a subsequent portion of the first signal that indicates the first eye is no longer closed, selecting, by the wearable computing device, the item that is identified as the currently-selectable item.

11. The method of claim 10, wherein the first eye includes a left eye of a wearer of the HMD, and the second eye includes a right eye of the wearer of the HMD.

12. The method of claim 10, wherein the first eye includes a right eye of a wearer of the HMD, and the second eye includes a left eye of the wearer of the HMD.

13. The method of claim 10, wherein receiving the first signal corresponding to the first eye comprises receiving the first signal from a first sensor coupled to the wearable computing device and configured to detect an eye gesture of the first eye, and wherein receiving the second signal corresponding to the second eye comprises receiving the second signal from a second sensor coupled to the wearable computing device and configured to detect an eye gesture of the second eye.

14. The method of claim 13, wherein the first sensor and the second sensor each include one or more of: an infrared proximity sensor, an infrared photodiode, and a camera.

15. The method of claim 13, wherein the first sensor and the second sensor are the same sensor.

16. A non-transitory computer readable medium having stored thereon instructions executable by a wearable computing device to cause the wearable computing device to perform operations comprising:
 receiving a first signal corresponding to a first eye;
 receiving a second signal corresponding to a second eye;
 detecting a portion of the first signal that indicates the first eye is closed;
 while the first signal indicates that the first eye is closed, responsively displaying a menu comprising a plurality of items on a head-mountable display of the wearable computing device, wherein one of the plurality items is identified as a currently-selectable item at any given point in time; and
 while the menu is displayed:
  (i) analyzing the second signal to detect for a portion of the second signal that indicates a blink of the second eye,
  (ii) in response to detection of a portion of the second signal that indicates a blink of the second eye, changing which of the plurality of items is identified as the currently-selectable item, and
  (iii) in response to detection of a subsequent portion of the first signal that indicates the first eye is no longer closed, selecting the item that is identified as the currently-selectable item.

17. The non-transitory computer readable medium of claim 15, further comprising additional instructions executable by the wearable computing device to cause the wearable computing device to perform operations comprising:
 while a given item of the plurality of items is identified as the currently-selectable item, responsively displaying additional information associated with the currently-selectable item on the head-mountable display of the wearable computing device.

18. The non-transitory computer readable medium of claim 15, further comprising additional instructions executable by the wearable computing device to cause the wearable computing device to perform operations comprising:
 in response to selecting the item that is identified as the currently-selectable item, displaying a subsequent menu comprising a subsequent plurality of items associated with the selected item on the head-mountable display of the wearable computing device.

19. The non-transitory computer readable medium of claim 15, further comprising additional instructions executable by the wearable computing device to cause the wearable computing device to perform operations comprising:
 while the menu is displayed:
  (i) analyzing the second signal to detect for a portion of the second signal that indicates the second eye is closed for a predetermined period of time exceeding that of a blink, and
  (ii) in response to detection of a portion of the second signal that indicates the second eye is closed for the predetermined period of time, displaying a preceding menu comprising a preceding plurality of items on the head-mountable display of the wearable computing device.

20. The non-transitory computer readable medium of claim 15, further comprising additional instructions executable by the wearable computing device to cause the wearable computing device to perform operations comprising:
 in response to changing which of the plurality of items is identified as the currently-selectable item, providing a non-visual response including one or more of: a vibration of the HMD and an audio source of the HMD emitting an audio response; and
 in response to selecting the item that is identified as the currently-selectable item, providing another non-visual response including one or more of: a vibration of the HMD and an audio source of the HMD emitting an audio response.

* * * * *